United States Patent [19]
Ellerhorst

[11] Patent Number: 5,813,609
[45] Date of Patent: Sep. 29, 1998

[54] HINGED LINED EXHAUST NOZZLE

[75] Inventor: Robert J. Ellerhorst, Cincinnati, Ohio

[73] Assignee: General Electric Company, Cincinnati, Ohio

[21] Appl. No.: 763,791

[22] Filed: Dec. 11, 1996

[51] Int. Cl.[6] ................................. G64D 33/04
[52] U.S. Cl. .................... 239/127.3; 239/265.33
[58] Field of Search ............... 239/127.1, 127.3, 239/265.19, 265.39

[56] References Cited

U.S. PATENT DOCUMENTS

| | | | |
|---|---|---|---|
| 3,972,475 | 8/1976 | Nelson et al. | 60/266 X |
| 4,128,208 | 12/1978 | Ryan et al. | 239/265 |
| 4,203,286 | 5/1980 | Warbuston | 60/266 |
| 5,101,533 | 4/1992 | Stenger et al. | 16/340 |
| 5,255,849 | 10/1993 | Mayer et al. | 239/127.3 |
| 5,364,029 | 11/1994 | Barcza | 239/127.3 |

FOREIGN PATENT DOCUMENTS

2235728  3/1971  United Kingdom ............... 239/127.3

*Primary Examiner*—Kevin Weldon
*Attorney, Agent, or Firm*—Andrew C. Hess; David L. Narciso

[57] ABSTRACT

An exhaust nozzle includes circumferentially adjoining primary flaps and seals hinged at forward ends to an annular casing. The primary flaps and seals are actuated between open and closed positions for varying flow area of a throat defined at the aft ends thereof. Respective pluralities of primary liners and seal liners are spaced radially inwardly from respective ones of the primary flaps and primary seals and circumferentially overlap each other. The primary liners and seal liners collectively define an annular flap duct disposed in flow communication with a cooling duct inside the casing for receiving a coolant therefrom for cooling the primary flaps and seals. The primary liners and seal liners are mounted to the primary flaps for pivoting movement therewith.

13 Claims, 10 Drawing Sheets

FIG. 12 ically spaced apart primary flaps which are hinged to the
5,813,609

HINGED LINED EXHAUST NOZZLE

The U.S. Government has rights in this invention in accordance with Contract No. N00019-91-C-0114 awarded by the Department of the Navy.

BACKGROUND OF THE INVENTION

The present invention relates generally to gas turbine engines, and, more specifically, to exhaust nozzles therefor.

A gas turbine engine includes a compressor for compressing air which is mixed with fuel in a combustor and ignited for generating hot combustion gases. The combustion gases flow downstream through one or more turbine stages and then are discharged from the engine. In one type of engine configured for powering a military aircraft in flight, an afterburner or augmenter is disposed downstream of the turbine stages and receives the combustion gases which are exhausted through a variable area exhaust nozzle.

The augmenter includes an outer casing having an annular liner therein which defines with the casing an annular cooling duct through which is channeled a suitable coolant, such as fan air which bypasses the combustion process. The liner also bounds a combustion zone wherein additional fuel is mixed with the exhaust gases and ignited when desired for generating additional thrust from the engine.

The exhaust nozzle includes a plurality of circumferentially spaced apart primary flaps which are hinged to the casing at their forward ends, with suitable primary seals adjoining adjacent ones of the primary flaps. Suitable means are provided for actuating the primary flaps to drive them radially inwardly for reducing exhaust flow area at the nozzle throat defined at the aft ends of the flaps.

During dry operation of the augmenter without additional fuel or thrust therefrom, the primary flaps are disposed in their closed position to provide a minimum flow area at the throat. During wet operation of the augmenter when additional fuel is added in the augmenter and ignited for generating additional thrust, the primary flaps are moved to their open position to provide maximum flow area at the throat. In this way, the variable area exhaust nozzle may be adjusted as desired to complement operation of the engine and augmenter, and maximize efficiency and thrust generation.

In some conventional designs, a plurality of circumferentially spaced apart secondary flaps are hinged at their forward ends to the aft ends of corresponding ones of the primary flaps. And, secondary seals circumferentially adjoin the adjacent secondary flaps. A corresponding plurality of outer links are joined between the casing and the aft ends of the secondary flaps to define four bar linkages which coordinate the position of the primary and secondary flaps in a converging-diverging (CD) nozzle as the throat area varies between minimum and maximum values.

Since the exhaust nozzle confines the hot exhaust gases discharged from the engine, it must be suitably cooled typically using a portion of the fan air or coolant channeled in the cooling duct. Some of the coolant cools the afterburner liner itself, and the remaining portion of the coolant is discharged from the aft end of the liner along the radially inner surfaces of the primary flaps and seals. A film of cooling air is thereby formed which flows downstream along the inner surfaces of the primary flaps and seals. As the film cooling air travels axially downstream along the flaps, its cooling effectiveness decreases.

Accordingly, the secondary flaps and seals are cooled substantially less than the primary flaps and seals by the film cooling air. Since hot streaks and non uniform film cooling occur during practice, both the primary and secondary flaps and seals are subject to locally elevated temperature which adversely affects the useful life of these components. Excess temperature leads to distortion and thermal stress cracking of these components which must therefore be replaced more often at an attendant high cost.

SUMMARY OF THE INVENTION

An exhaust nozzle includes circumferentially adjoining primary flaps and seals hinged at forward ends to an annular casing. The primary flaps and seals are actuated between open and closed positions for varying flow area of a throat defined at the aft end thereof. Respective pluralities of primary liners and seal liners are spaced radially inwardly from respective ones of the primary flaps and primary seals and circumferentially overlap each other. The primary liners and seal liners collectively define an annular flap duct disposed in flow communication with a cooling duct inside the casing for receiving a coolant therefrom for cooling the primary flaps and seals. The primary liners and seal liners are mounted to the primary flaps for pivoting movement therewith.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
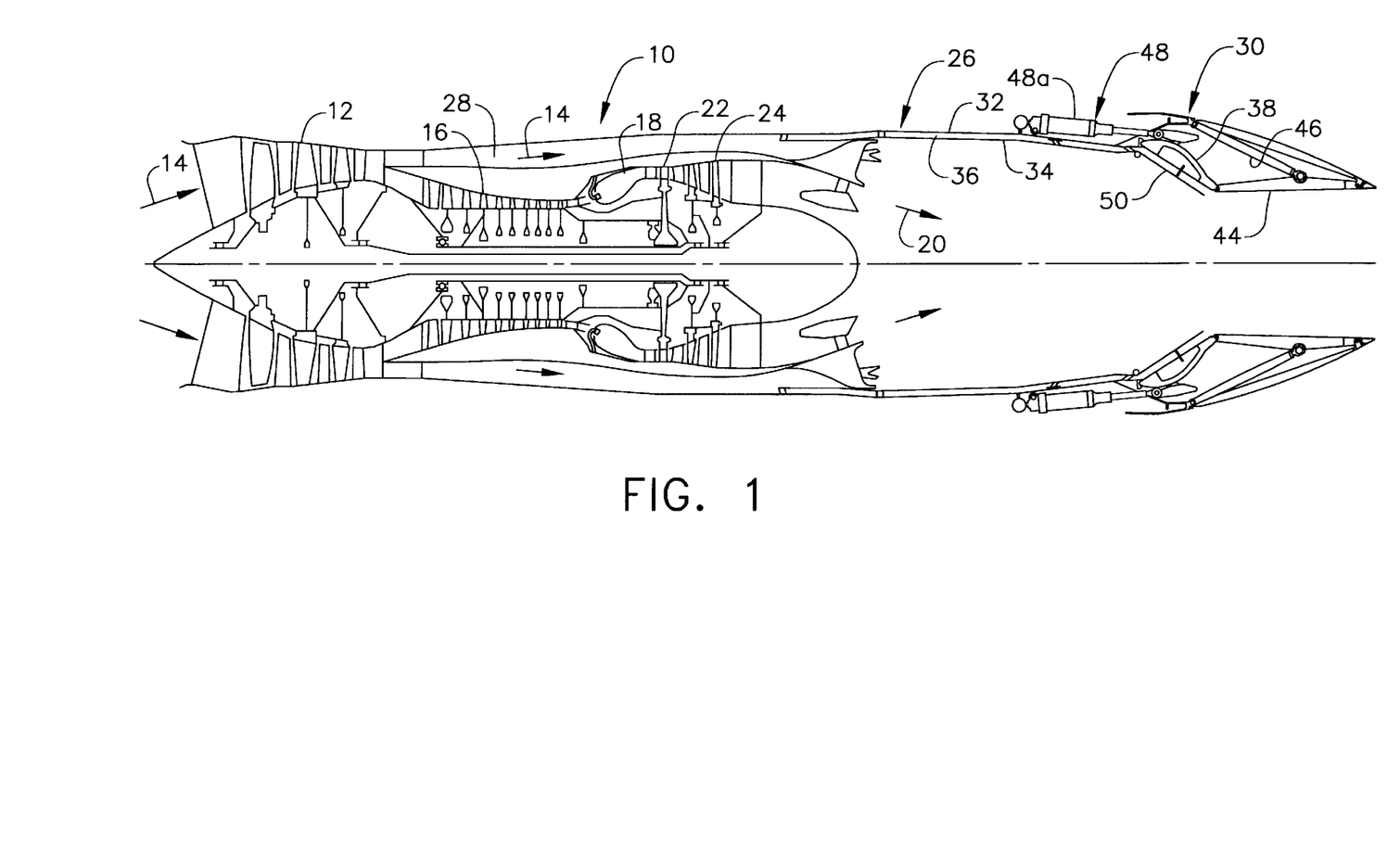
FIG. 1 is an axial sectional view of an exemplary bypass turbofan gas turbine engine having an augmenter and variable area exhaust nozzle in accordance with one embodiment of the present invention.

Illustrated schematically in FIG. 1 is an exemplary bypass turbofan gas turbine engine 10 which is axisymmetric about an axial or longitudinal centerline thereof. The engine 10 includes a multistage fan 12 which receives air 14 that is pressurized therein and channeled downstream through the engine. A portion of the air 14 enters a multistage high pressure compressor 16 wherein it is further compressed and discharged to an annular combustor 18 wherein it is mixed with fuel and ignited for generating hot combustion gases 20 which flow downstream through a high pressure turbine 22 and a low pressure turbine 24.

The high pressure turbine 22 is a single stage turbine joined to the compressor 16 by a corresponding drive shaft and extracts energy from the combustion gases 20 for powering the compressor 16. The low pressure turbine 24 is a two-stage turbine joined to the fan 12 10 by a corresponding drive shaft and also extracts energy from the combustion gases 20 for powering the fan 12.

Disposed downstream from the low pressure turbine 24 is an afterburner or augmenter 26 which receives the combustion gases 20 therefrom. The augmenter 26 is also disposed in flow communication with an annular bypass duct 28 which surrounds the core engine upstream to the aft end of the fan 12 for receiving a portion of the fan air which is suitably mixed with the combustion gases 20 inside the augmenter 16.

The engine 10 as described above may take any conventional form for discharging the combustion gases 20 and bypass portion of the fan air 14 into the augmenter 26. The augmenter 26 itself may also take any conventional form for injecting additional fuel into the air and gas mixture, which is ignited for generating additional thrust when desired in an augmented, wet mode of operation.

In order to maximize efficiency and thrust performance of the augmenter 26, a variable area exhaust nozzle 30 in accordance with one embodiment of the present invention is suitably mounted to the downstream end of the augmenter 26. The exhaust nozzle 30 is an axisymmetric assembly of components which are illustrated in more particularity in FIG. 2. The nozzle 30 includes an annular exhaust duct or casing 32 which provides a stationary structural support for the nozzle components and is shared with the augmenter 26. An annular exhaust or duct liner 34 is spaced radially inwardly from the casing 32 to define an annular cooling duct 36 for channeling a portion of the bypass fan air as a coolant 14 in an aft direction therethrough. The exhaust liner 34 is conventional and includes various holes therethrough for providing effective cooling of the liner 34 during operation.

Figure 2:
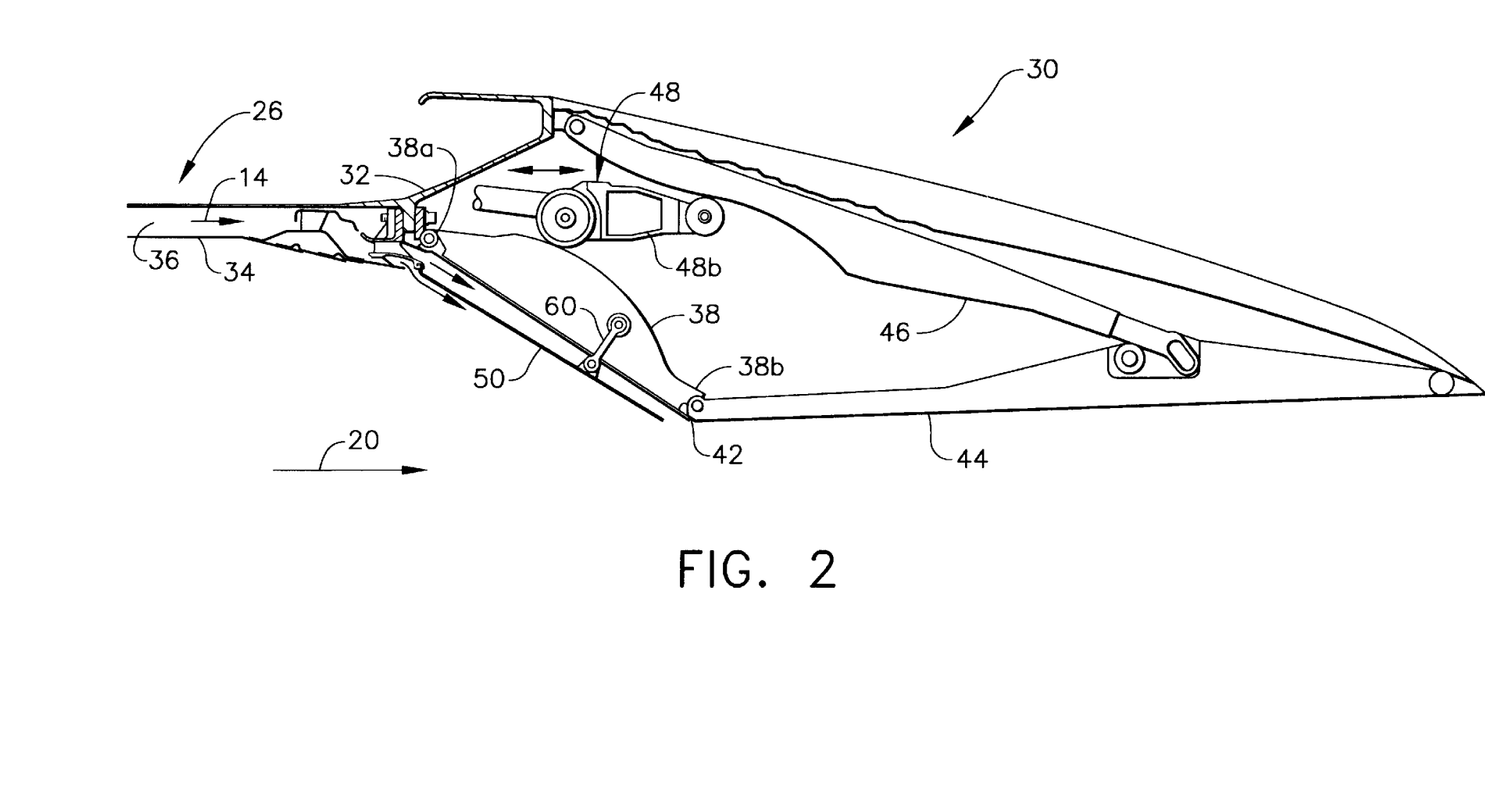
FIG. 2 is an enlarged, partly sectional axial view of a portion of the exhaust nozzle illustrated in FIG. 1 illustrating primary and secondary flaps therein, along with a primary flap liner in accordance with one embodiment of the present invention.

The nozzle 30 includes a plurality of circumferentially spaced apart primary exhaust flaps 38 having respective forward ends 38a suitably hinged to the casing 32 at forward joints for allowing radially inward pivoting movement thereabout.

Figure 3:
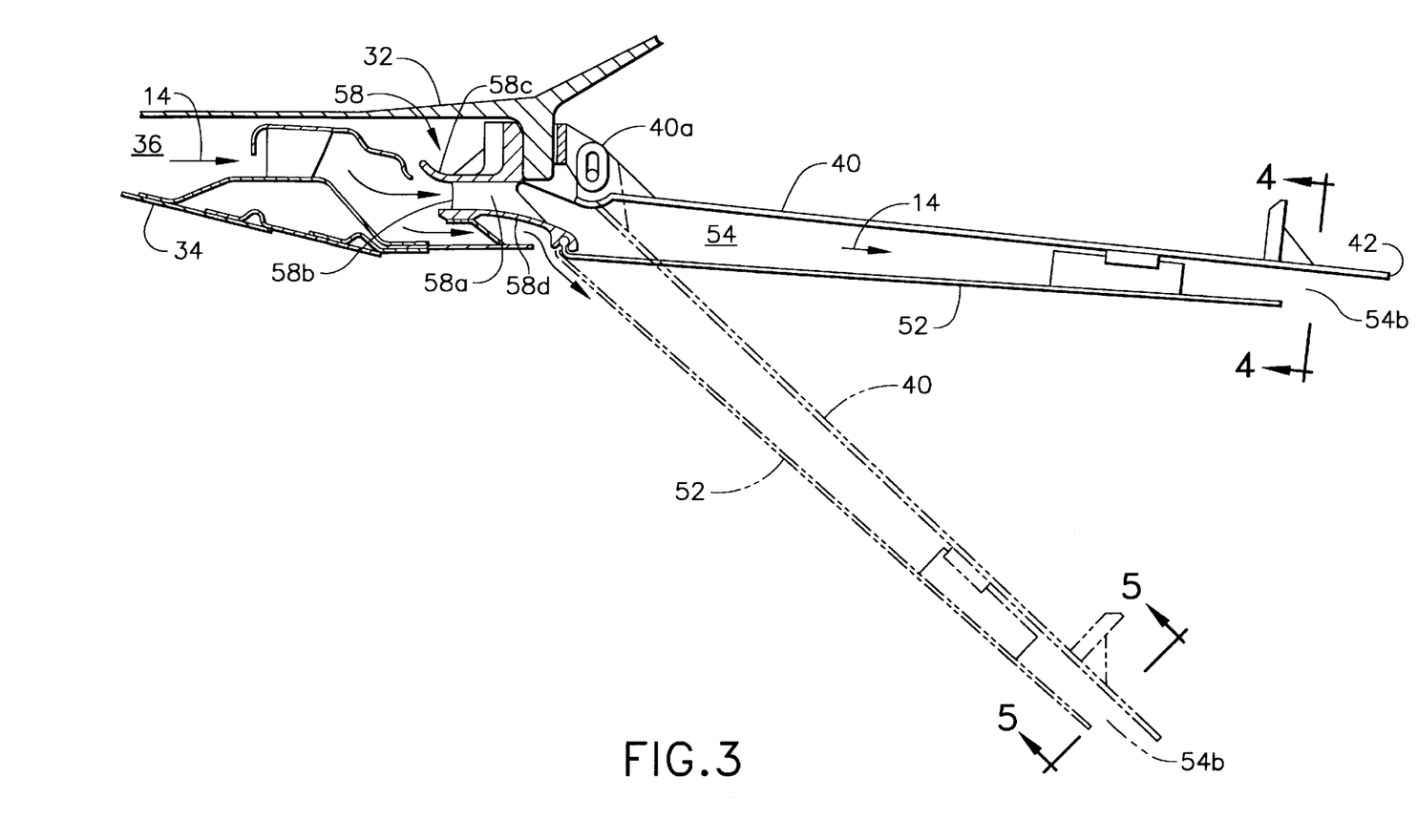
FIG. 3 is a partly sectional axial view through a seal liner adjoining the primary liner illustrated in FIG. 2, adjacent to a cooperating primary seal in accordance with an exemplary embodiment of the present invention.
Figure 4:
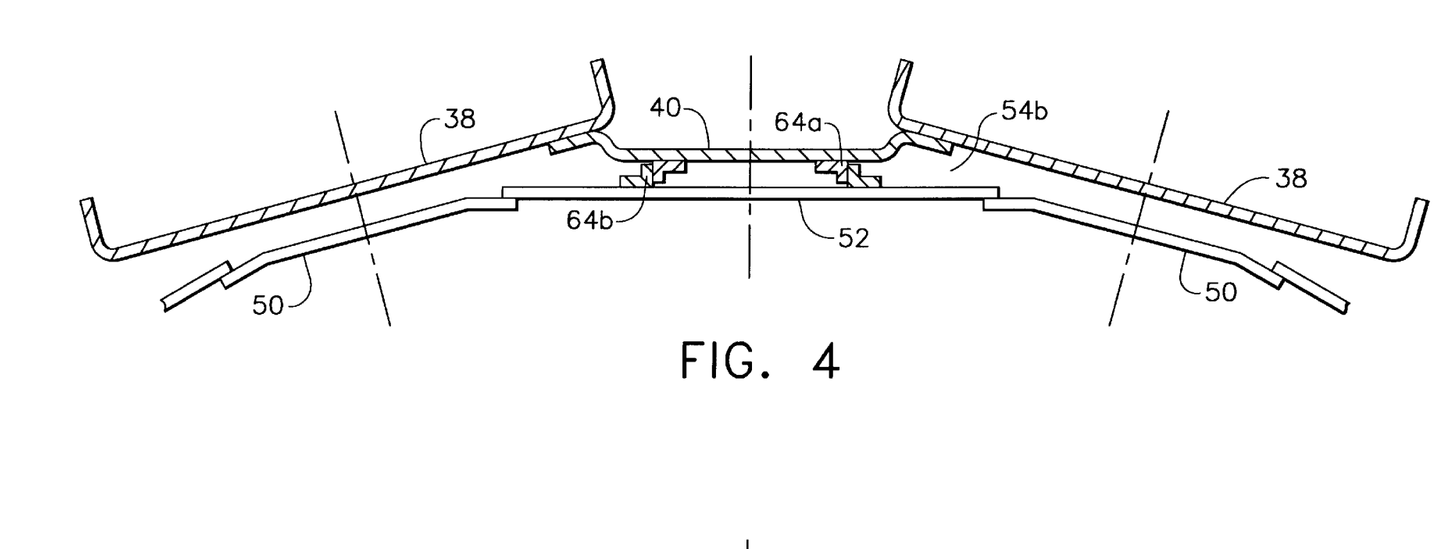
FIG. 4 is a radial, aft-facing-forward view of a portion of adjoining primary flaps and seals, and primary liners and seal liners in an open position of the primary flaps and liners as illustrated in FIG. 3 and taken generally along line 4—4.
Figure 5:
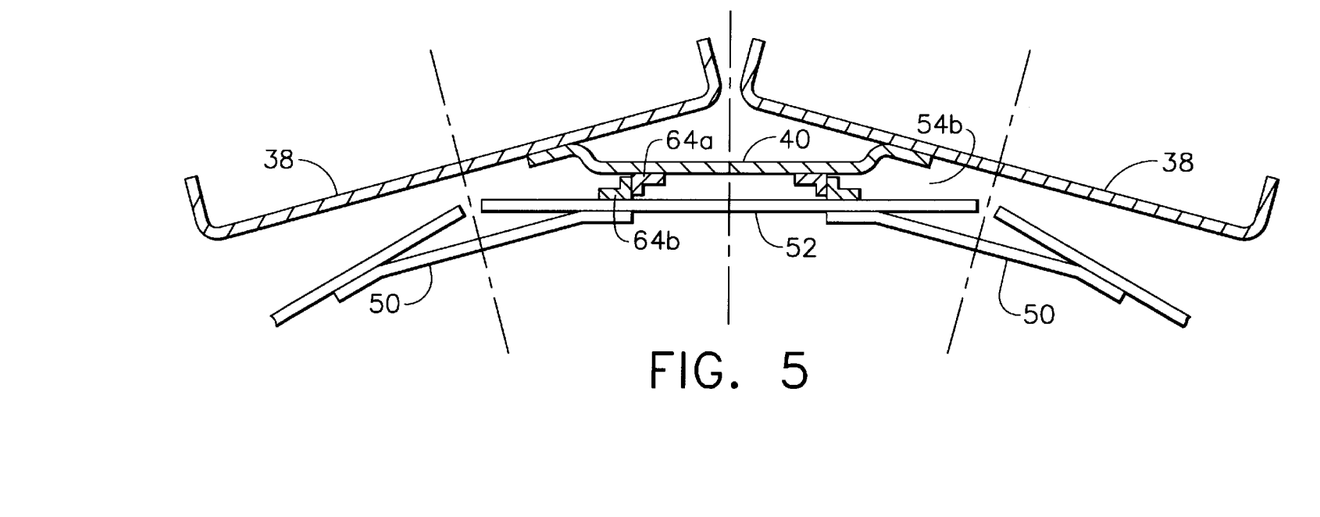
FIG. 5 is a radial, aft-facing-forward view of a portion of adjoining primary flaps and seals, and primary liners and seal liners in a closed position of the primary flaps and liners as illustrated in FIG. 3 and taken generally along line 5—5.

FIG. 3 illustrates a plurality of circumferentially spaced apart primary seals 40 having forward ends 40a hinged to the casing 32 at corresponding forward joints for allowing pivoting movement thereabout. The primary seals 40 circumferentially overlap adjacent ones of the primary flaps 38 as shown in FIGS. 4 and 5 to provide contact seals along the axial edges thereof. The primary flaps 38 and primary seals 40 collectively define an annular throat 42, as shown in FIGS. 2 and 3, for discharging the exhaust gases 20 therethrough.

Referring again to FIG. 2, the nozzle 30 preferably also includes a plurality of circumferentially spaced apart secondary flaps 44 having forward ends hinged to respective aft ends 38b of the primary flaps 38. Corresponding secondary seals (not shown) are disposed between adjacent ones of the secondary flaps 44 in contact sealing engagement therewith.

A corresponding plurality of outer links 46, also referred to as compression links, have forward ends suitably hinged to the casing 32, and aft ends suitably hinged to the secondary flaps 44 to define corresponding four-bar linkages which control kinematic motion.

Figure 6:
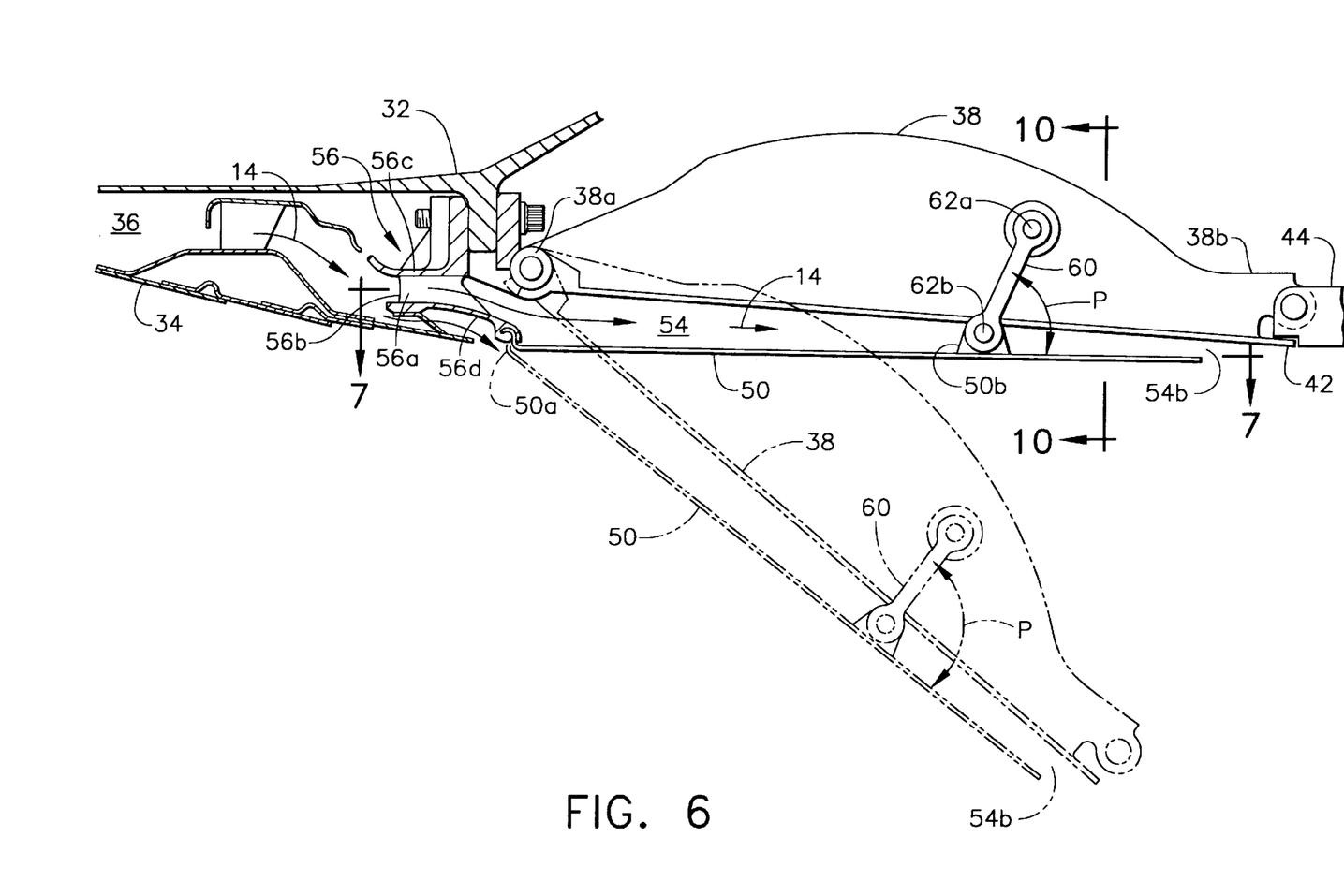
FIG. 6 is an enlarged partly sectional axial view of one of the primary flaps illustrated in FIG. 2 along with the primary flap liner in accordance with one embodiment of the present invention.

As shown in FIGS. 1 and 2, suitable means 48 are provided for actuating the primary flaps 38 between an open position illustrated in solid line in FIG. 6 and a closed position illustrated in phantom in FIG. 6 for varying the discharge flow area of the throat 42 between maximum and minimum areas, respectively. The actuating means 48 may take any conventional form including a plurality of linear hydraulic actuators 48a having axially extendable output rods which are suitably joined to an actuation ring 48b illustrated in FIG. 2.

The outboard surface of the primary flaps 38 as illustrated in FIG. 2 has a suitable cam profile which engages corresponding rollers in the actuation ring 48b when the pressurized exhaust gases 20 push the primary flaps 38 radially outwardly. The actuation ring 48b is suitably translated over a desired axial range both forwardly and aft which controls the pivoted or angular position of the primary flaps 38. By translating the actuation ring 48b to its maximum aft position, the primary flaps 38 are allowed to assume their maximum open position and a corresponding maximum flow area of the throat 42. When the actuation rig 48b is translated to its maximum forward position, the primary flaps 38 are correspondingly forced radially inwardly to their maximum closed position and a corresponding minimum area of the throat 42.

The secondary flaps 44 are carried with the movements of the corresponding flaps 38 to which they are pivotally attached since they are disposed in four-bar linkages which control the kinematic motion of the collective components to form a converging-diverging (CD) nozzle.

The exhaust nozzle 30 as so described may have any conventional form and configuration and is conventionally operated between its open and closed positions of the primary flaps 38 to obtain the corresponding variable area of the throat 40 between its maximum and minimum areas.

However, in accordance with the present invention, both the primary and secondary flaps 38, 44 and their cooperating seals are provided with cooling by suitably channeling thereto a portion of the fan bypass air 14 from the cooling duct 36. Referring initially to FIG. 6, the nozzle 30 further includes a plurality of circumferentially spaced apart primary flap liners 50, each spaced radially inwardly from a respective one of the primary flaps 38.

Figure 7:
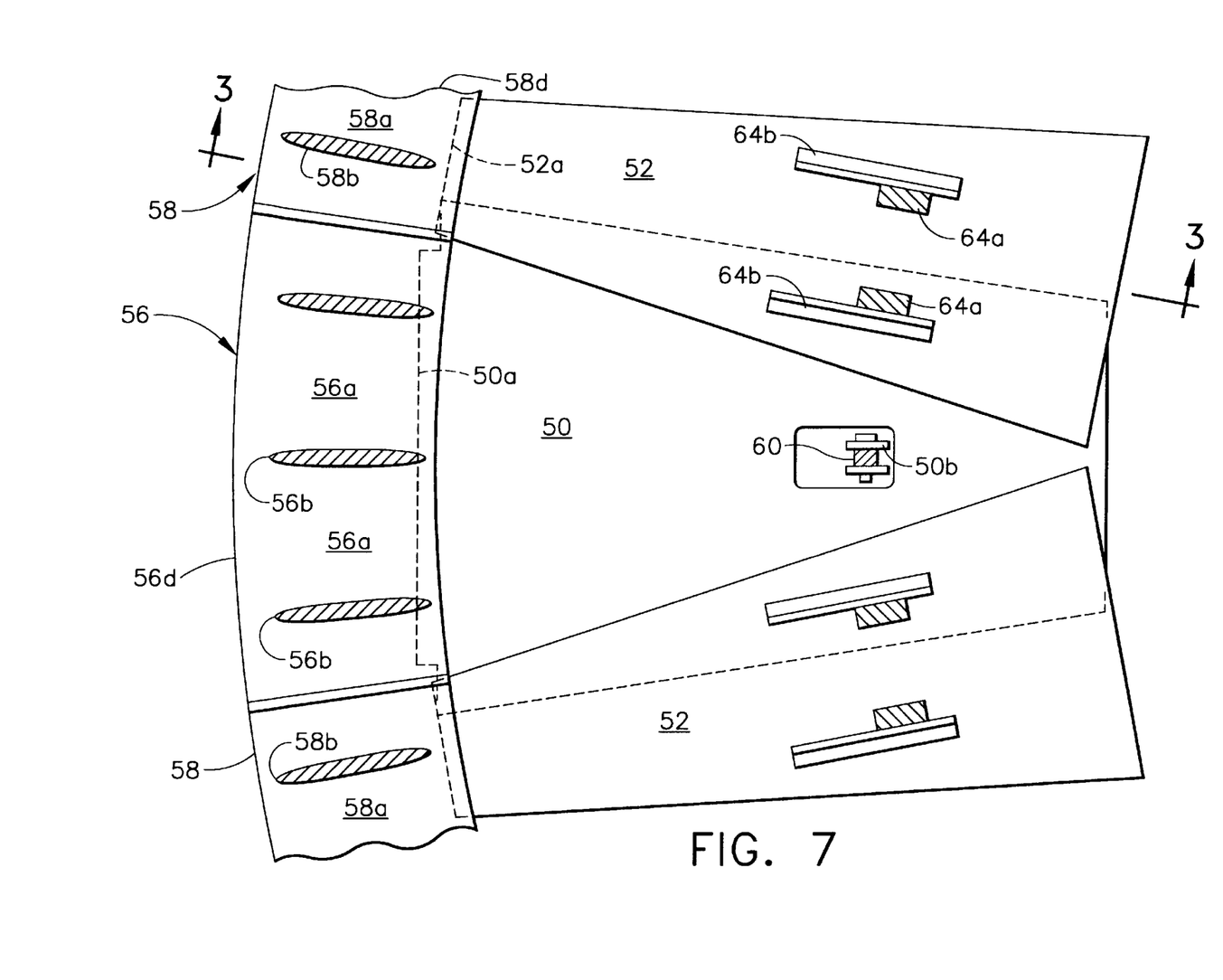
FIG. 7 is a radially inwardly facing, plan view of adjacent primary liners and adjoining seal liners in the phantom closed position illustrated in FIG. 6 and taken generally along line 7—7.

As shown in FIG. 3, a plurality of circumferentially spaced apart seal liners 52 are each spaced radially inwardly from respective ones of the primary seals 40. The seal liners 52 circumferentially overlap adjacent ones of the primary liners 50 as illustrated in FIG. 4, 5, and 7. The circumferentially overlapping edges of the primary liners 50 and cooperating seal liners 52 provide contact seals thereat, with the primary liners 50 and seal liners 52 collectively defining an annular flap duct 54 as shown in FIGS. 3–6.

The flap duct 54 is disposed in flow communication with the exhaust cooling duct 36 for receiving the coolant 14 therefrom for cooling the primary flaps 38 and primary seals 40, as well as the back sides of the liners 50, 52. As disclosed hereinbelow, the coolant discharged from the flap duct 54 is also used for providing enhanced film cooling of the secondary flaps 44 and their corresponding seals.

As shown in FIGS. 3 and 6, suitable means are provided for mounting the primary liners 50 and cooperating seal liners 52 at least in part to the primary flaps 38 for pivoting movement therewith. In order to effectively cool the primary flaps 38 which pivot between their open and closed positions, the liners 50, 52 must also suitably pivot therewith.

Referring firstly to FIGS. 6 and 7, the mounting means for the primary liners 50 are disclosed in an exemplary embodiment. A plurality of first hinge supports 56 are fixedly mounted to the casing 32 at respective ones of the primary flaps and liners 38, 40, at the respective forward ends thereof. Each first hinge support 56 includes an inlet 56a which is defined circumferentially between spaced apart radial struts 56b, and radially between an outer band 56c and an inner band 56d. The outer band 56c is suitably fixedly attached to the casing 32 by suitable fasteners which may also be used for mounting the primary flaps 38 thereto.

The inlet 56a is disposed in flow communication with the cooling duct 36 and the flap duct 54 for channeling the coolant 14 through the support 56 and flap duct 54 to cool both the primary flap 38 and cooperating primary liner 50.

Figures 8, 9:
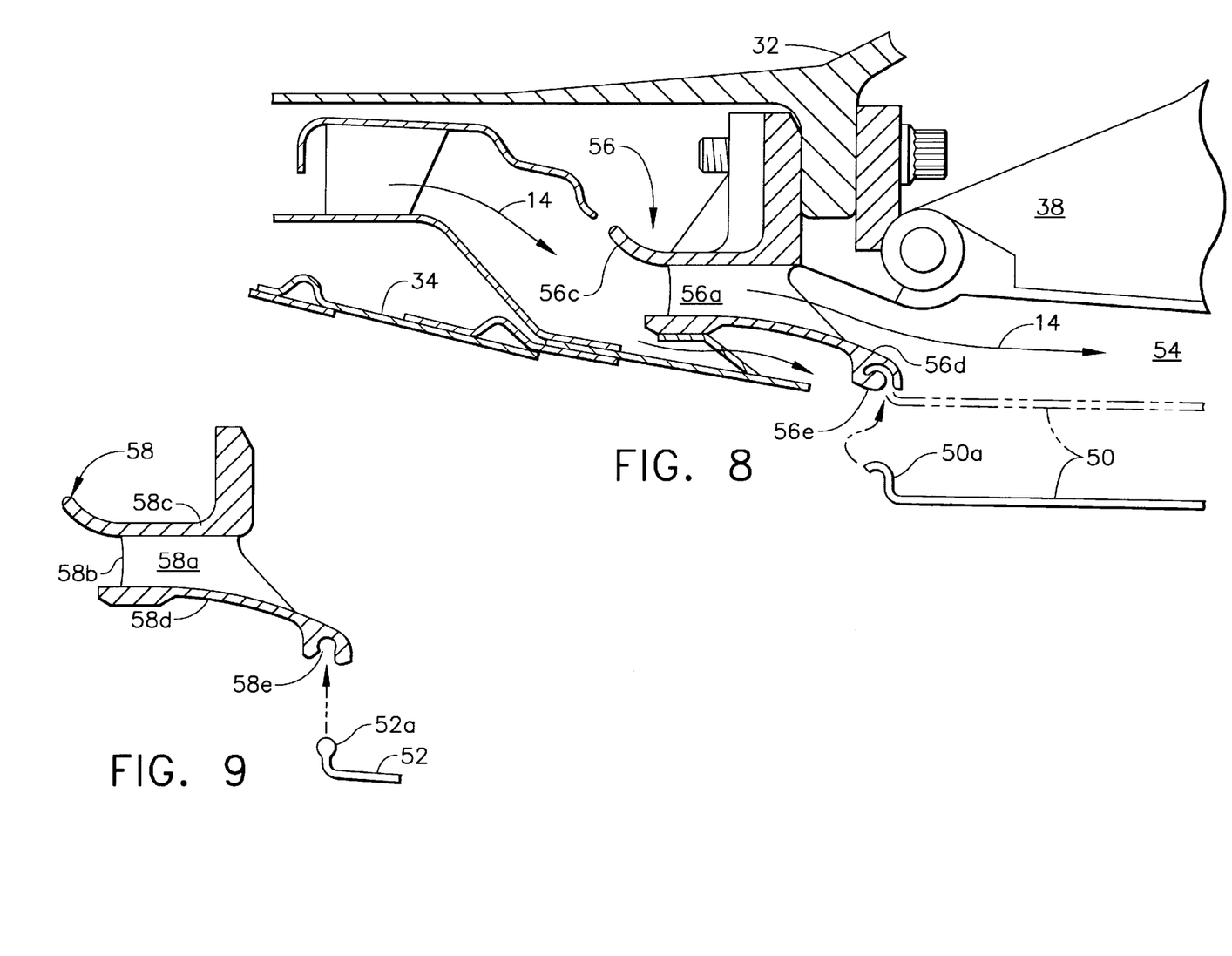
FIG. 8 is an enlarged axial view, partly exploded, of the upstream ends of the primary flap and cooperating primary liner shown in FIG. 6.
FIG. 9 is an enlarged, exploded axial view of the upstream end of the seal liner illustrated in FIG. 3.

Disposed at the aft end of the inner band 56d is a radially inwardly facing first hinge slot 56e illustrated in more particularity in FIG. 8 which is provided for engaging a respective forward hinge end 50a of a respective one of the primary liners 50 to define a first hinge thereat. In the exemplary embodiment illustrated in FIG. 8, each of the primary liner hinge ends 50a engages the first hinge slot 56e at least in part with axial overlap for providing radially inward and outward restraint, The hinge end 50a is generally S-shaped, and a corresponding axial section of the first hinge slot 56e is complementarily arcuate so that the hinge end 50a may be simply inserted therein during assembly and rotated in the counterclockwise direction as illustrated in FIG. 8 to interlock the hinge end 50a in its retaining slot 56e, with the primary liner 50 then being moved into substantially parallel position with the bottom of the primary flap 38. In this way, a relatively simple friction hinge is defined by only the two engaging components consisting of the hinge end 50a in its mating slot 56e.

As shown in FIG. 6, the hinge allows the primary liners 50 to rotate with rotation of the primary flaps 38 while maintaining an effectively sealed joint so that the coolant 14 may be channeled through the inlet 56a and in an aft direction through the flap duct 54. The primary liners 50 may therefore be readily assembly to or disassembled from the respective primary flaps 38 as desired using the simple hinge support at the forward ends thereof.

In order to similarly support the seal liners 52, a plurality of generally similar second hinge supports 58 are also fixedly joined to the casing 32 as illustrated in FIGS. 3 and 7. The second hinge supports 58 correspondingly support forward hinge ends 52a of the seal liners 52, as shown in more particularity in FIG. 9. Each of the second hinge supports 58 includes an inlet 58a defined between adjacent struts 58b, which are identical to the struts 56a of the first hinge support, with the inlets 58a being similarly disposed in flow communication with the cooling duct 36 and the flap duct 54 for channeling the coolant 14 through the flap duct 54 for cooling the primary seals 40 and the seal liners 52.

Like the first hinge supports 56, the second hinge supports 58 include in like fashion outer and inner bands 58c,d which are circumferentially coextensive with the corresponding outer and inner bands 56c,d. And, the inner band 58d includes a second hinge slot 58e, shown in particularity in FIG. 9, for engaging the respective hinge ends 52a of the seal liners 52 to define corresponding second hinges thereat.

As shown in FIG. 9, the second hinge slot 58e, unlike the first hinge slot 58e illustrated in FIG. 8, faces or opens radially inwardly in a generally U-shaped configuration for receiving the seal liner hinge end 52a in radial outboard restraint in a general tongue-and-groove arrangement, and without radially inward restraint. In this way, the seal liners 52 may be readily assembled adjacent to the corresponding primary seals 40 by simply radially engaging the hinge end 52a into the corresponding slot 58e.

Without additional restraint, the seal liners 52 are allowed to fall out of the slots 58e. This is prevented, however, by disposing or positioning the primary liners 50 radially inwardly of the seal liners 52 as shown in FIGS. 4, 5, and 7 for radially inwardly retaining the seal liners 52. Since the primary liners 50 circumferentially overlap adjacent ones of the seal liners 52 on their radially inboard sides, and since the primary liners 50 are restrained both radially outwardly and inwardly as illustrated in FIGS. 6 and 8, the primary liners 50 also radially retain the seal liners 52 allowing their hinge joints to be made more simple, and improving ease of assembly and disassembly. And most importantly, this allows the seal liner 52 to sealingly contact the primary liner 50 along its full axial length. If desired, the mounting arrangements for the primary liner 50 and the seal liner 52 may be reversed.

Since the primary liners and seal liners 50, 52 are hinge supported at solely their forward ends, the mounting means therefor must also include additional features for mounting the aft ends thereof as well. FIGS. 6 and 7 illustrate an exemplary embodiment of a plurality of support links 60 which join respective ones of the primary liners 50 to the primary flaps 38. At least one support link 60 is disposed between corresponding ones of the primary flaps 38 and primary liners 50 at an axially intermediate or aft support 50b which is disposed downstream of the hinge end 50a thereof.

Figure 10:
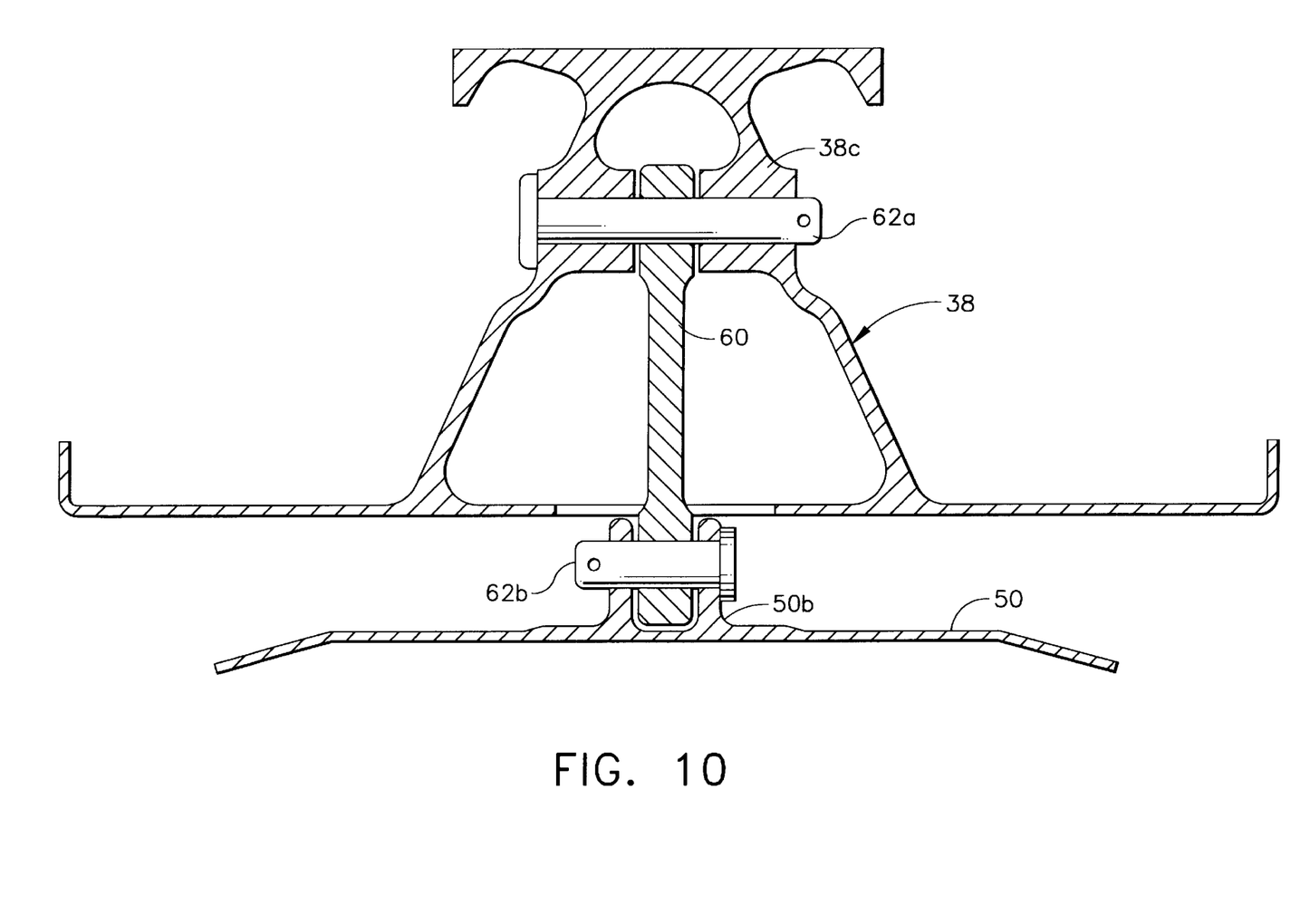
FIG. 10 is a radial sectional view through an exemplary primary flap and primary liner, and supporting link therebetween as illustrated in FIG. 6 and taken generally along line 10—10.

Each of the support links 60 is configured for allowing differential or relative axial movement between the primary liners 50 and primary flaps 38 to which they are attached as they both pivot together radially inwardly about their corresponding hinges. In the exemplary embodiment illustrated in FIGS. 6 and 10, the support link 60 is a radial link extending radially between respective pairs of the primary flaps 38 and primary liners 50 and is suitably pivotally joined thereto. As shown in FIG. 10, a pair of pins 62a,b extend through apertures in radially opposite ends of the support link 60 which correspondingly 1engage a suitable clevis 38c defined in the primary flap 38, with the aft support 50b of the primary liner 50 being configured as a clevis for pin mounting the bottom end of the support link 60 thereto.

In the preferred embodiment illustrated in FIG. 6, each of the support links 60 is preferably disposed substantially normal to the respective seal primary liner 50 when the primary flap 38 is in its closed, minimum flow area position. This is illustrated in phantom line in FIG. 6 with the position angle P between the support link 60 and the primary liner 50 being 90°. Also in the preferred embodiment, the support link 60 is disposed at an acute angle, where P is about 65° for example, to the respective primary liner 50 when the primary flap 38 is in its open, maximum flow area position shown in solid line in FIG. 6. Since both the primary flap 38 and primary liner 50 are hinged at radially spaced apart forward ends, they will experience relative axial movement when the primary flap 38 is pivoted radially inwardly. The pin mounted support link 60 allows relative axial movement between these components without restraining pivoting movement of the primary flap 38 during operation.

The relative positions of the support pins 62a,b may be adjusted along with the axial position of the support link 60 as well as its length to control the relative radial movement between the primary liner 50 and the primary flap 38. Since these two components define the flap duct 54, the support links 60 control the cross sectional flow area thereof.

In the preferred embodiment illustrated in FIGS. 3 and 6, the flap duct 54 includes an annular outlet 54b at an aft end thereof which is disposed in flow communication with a radially inner surface of the secondary flaps 44 for discharging the coolant 14 therealong for film cooling the secondary flaps 44 and their cooperating seals. Accordingly, the flap duct 54 not only effectively cools the primary flaps 38 along their axial extent, but also increases film cooling to the secondary flaps 44 for the cooling thereof.

As indicated above, the support link 60 is preferably disposed normal to the primary liner in the closed position of the primary flaps 38 as illustrated in phantom in FIG. 6. This corresponds to the phantom position of the cooperating primary seals 40 illustrated in FIG. 3. FIG. 5 illustrates an end view of the flaps 38, seals 40, and liners 50, 52, and a corresponding portion of the flap duct outlet 54b -with its radially maximum height.

When the primary flaps 38 are returned to their open position as shown in solid line in FIG. 6, the corresponding primary seals 40 are also returned to their open position as illustrated in FIG. 3, and FIG. 4 illustrates an end view of these corresponding components and the flap duct 54b with its radially minimum height. The difference in radial height of the flap duct outlet 54b between FIGS. 4 and 5 is caused by rotation of the support link 60 as the primary liner 50 travels axially relative to the primary flap 38. Comparing FIGS. 4 and 5, the FIG. 4 outlet 54b is at a substantially larger radius than it is in FIG. 5 and therefore the overall discharge flow area of the outlet 54b is greater in FIG. 4 at the open position of the primary flaps 38 than it is in FIG. 5 with the primary flaps 38 being in their closed position.

In the preferred embodiment illustrated in FIGS. 4 and 5, it is desired to minimize back pressure on the coolant 14 in the flap duct 54 when the primary flaps 38 are in their closed position. This is accomplished by providing a maximum radial height of the flap duct outlet 54b in FIG. 5. In the exemplary embodiment illustrated in FIGS. 4 and 5, there is about a 50% reduction in radial height of the outlet 54b from the closed position of FIG. 5 to the open position of FIG. 4. Alternatively, there is a 50% reduction in flow area of the outlet 54b from the FIG. 4 open position to the FIG. 5 closed position.

Correspondingly, the cooling flow area of the duct outlet 54b doubles from the closed position of FIG. 5 to the open position of FIG. 4 when maximum thrust, wet operation of the augmenter is desired. Accordingly, increased cooling of the nozzle components is provided by the increased flow area of the flap duct outlet 54b and corresponding coolant flow therethrough in the open position illustrated in FIG. 4. Yet, in the closed position of FIG. 5, flow through the outlet 54b is substantially reduced for improving efficiency in dry operation.

The pivoting support link 60 may therefore be used for tailoring discharge flow area of the outlet 54b as desired. The length of the support link 60 may be adjusted to increase or decrease the exit area of the outlet 54b throughout the operating range of the nozzle 30. The angular position P of the link 60 may be selected to optimize the flow areas of the outlet 54b at the minimum and maximum flow areas associated with the throat 42. The flap duct outlet 54b may also be used for metering the coolant therethrough, or the collective flow area of the hinge support inlets 56a, 58a may instead be used for metering the flow if desired. Since the velocity of the exhaust gases 20 which flow through the throat 42 during operation may reach about Mach 1, it is desirable to size the flap duct outlet 54b so that the coolant 14 discharged therefrom is also at or as close as possible to Mach 1 as well.

As shown in FIG. 7, there is ample room for mounting the support link 60 on individual primary liners 50, and circumferentially between the overlapping seal liners 52. Also shown in FIG. 7 is the circumferential extent of one of the primary liners 50. Since the primary liner 50 is relatively wide, the circumferential extent of the hinge end 50a is also substantially large which provides suitable circumferential restraint of the individual primary liners 50.

However, the circumferential extent of the hinge end 52a of the seal liners 52 is correspondingly relatively small. This may or may not provide suitable lateral restraint during operation depending on a particular design. For a seal liner 52 with a relatively narrow forward hinge end, suitable means may be provided for maintaining axial and circumferential alignment between the primary seals 40 and cooperating seal liners 52. In FIGS. 4, 5, and 7, these alignment means are in the exemplary form of a pair of cooperating axially extending 19 rails 64a,b suitably fixedly mounted to respective ones of the primary seals 40 and seal liners 52. The rails 64a,b circumferentially center respective ones of the seal liners 52 relative to the primary seal 40 in an axial sliding contact fit therebetween.

Figure 11:
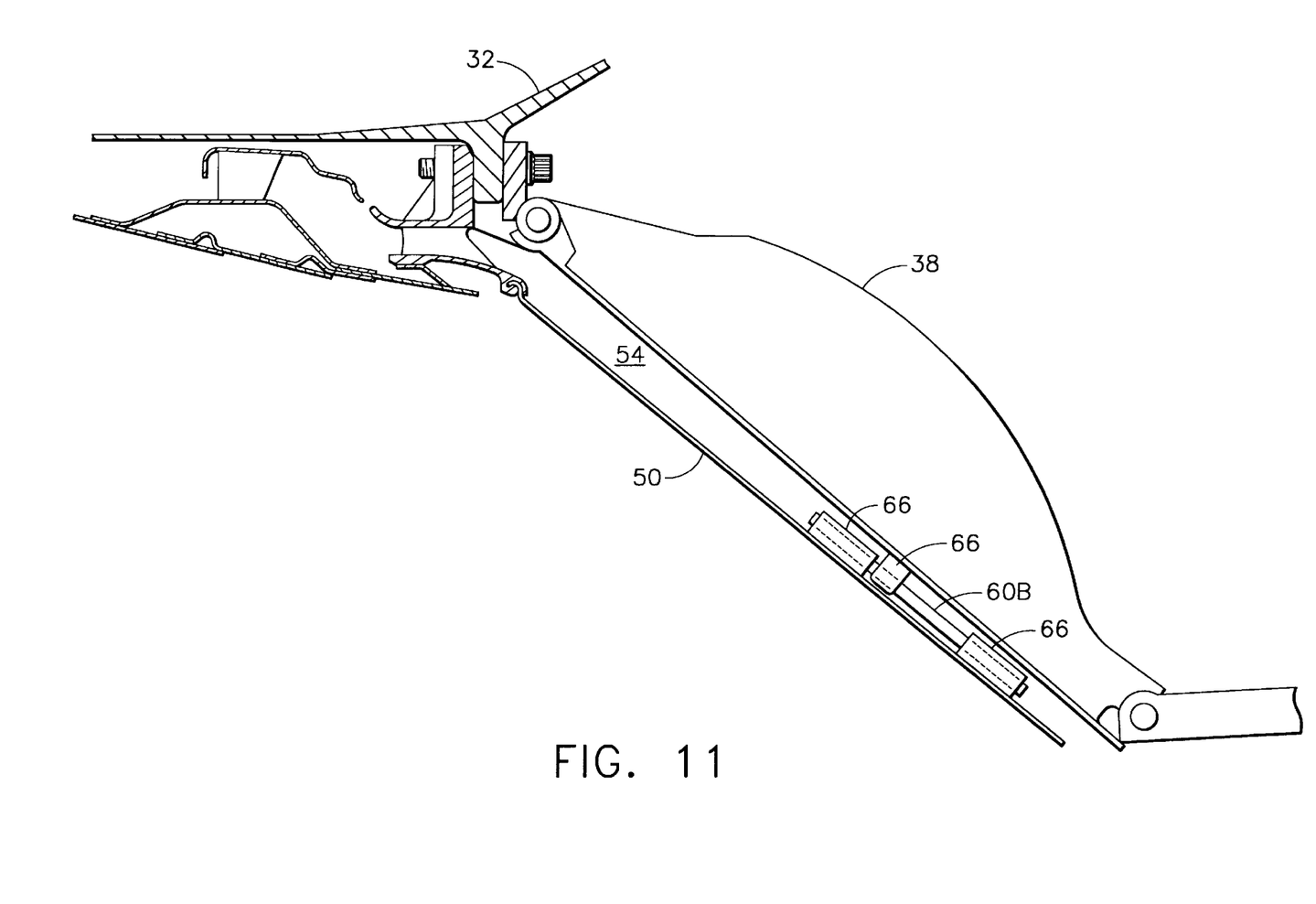
FIG. 11 is an axial sectional view like FIG. 3 illustrating an alternate embodiment of the supporting link between the primary flaps and liners.

The support link 60 may take other suitable forms as desired. For example, FIG. 11 illustrates that each of the support links may take the form of a simple rod designated 60B extending longitudinally, parallel or inclined, between corresponding surfaces of the primary flaps 38 and the primary liners 50 inside the flap duct 54. The rod link 60B is suitably slidingly mounted in a plurality of link blocks 66 respectively fixedly joined to the primary flap 38 and primary liner 50. As shown in FIG. 11, two end blocks 66 are axially spaced apart atop the primary liner 50, and a third center block 66 is mounted therebetween to the inner surface of the primary flap 38, with the rod link 60B extending axially therethrough. In this arrangement, the primary liner 50 is allowed to axially translate relative to the primary flap 38 as the rod slides through the center block 66.

Figure 12:
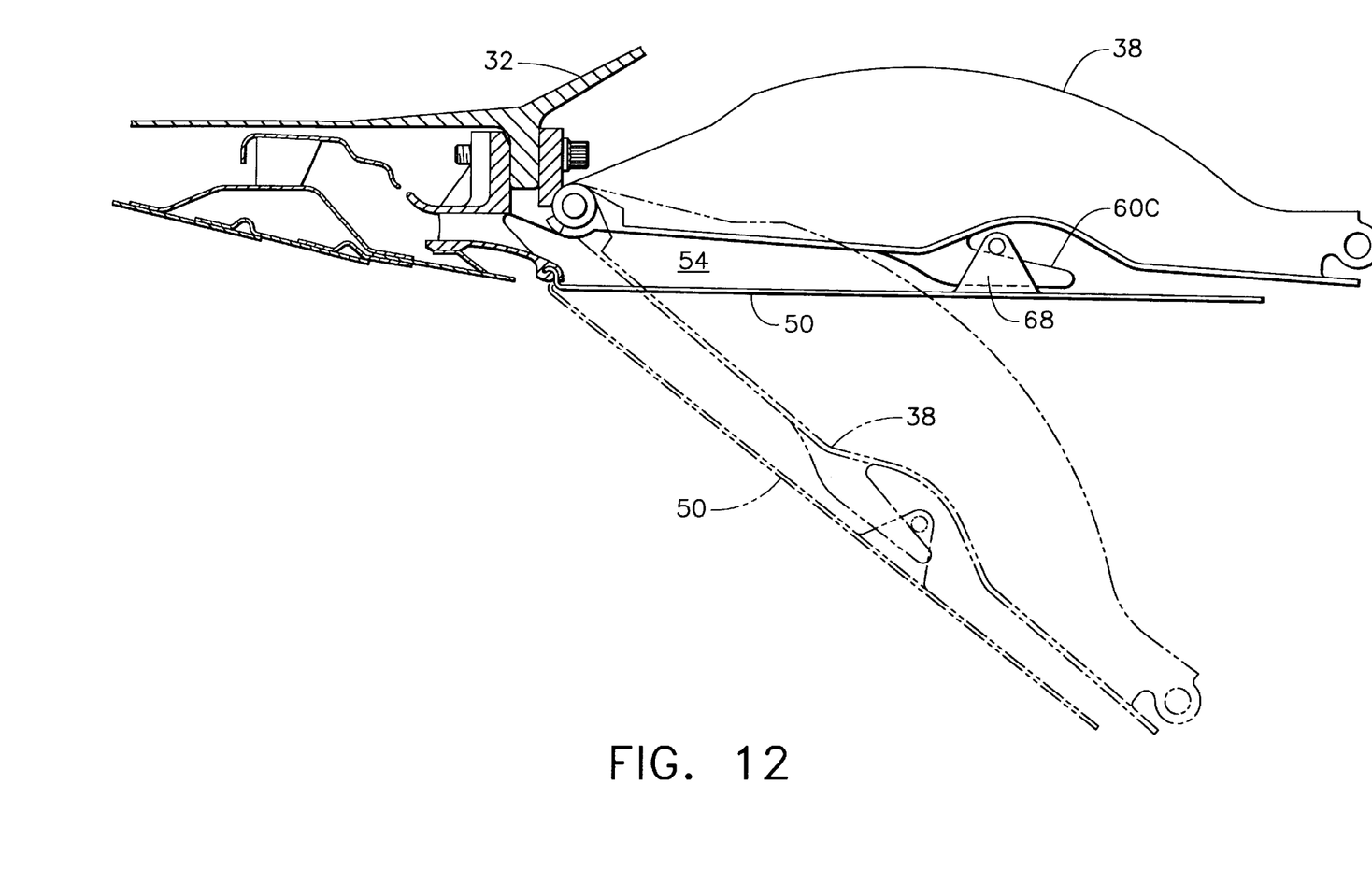
FIG. 12 is an axial sectional view like FIG. 3 illustrating an alternate embodiment of the supporting link between the primary flaps and liners.

In FIG. 1 2, the supporting links may take the form of a simple cantilever designated 60C fixedly joined to a respective one of the primary flaps 38. The distal end of the cantilever link 60C is slidingly mounted in a respective link block 68 suitably fixedly mounted to a respective one of the primary liners 50. The link block 68 includes a suitable aperture therethrough for receiving the cantilever link 60C which engages a lateral pin in the link block 68. In this way, the primary liner 50 may also axially translate relative to the primary flap 38. If desired, the cantilever link 60C may be tapered or narrowed in radial height in the axial aft direction for controlling the radial height of the flap duct 54 as the primary flap 38 moves between its open and closed positions.

The various embodiments of the hinged liner design of the exhaust nozzle 30 disclosed above provide effective inboard convection cooling of the primary flaps 38 and their cooperating primary seals 40, as well as outboard cooling of the liners 50, 52 themselves. The coolant 14 initially flows through the flap duct 54, and is then discharged from the outlet 54b as film cooling air for cooling the secondary flaps 44 and cooperating seals. Since the nozzle components enjoy improved cooling, less expensive or lighter-weight materials may be used therefor if desired. Instead of high temperature nickel-based superalloys for these components, lower temperature titanium alloys may be used instead. The liners 50, 52 may be formed of any suitable high temperature exhaust liner material such as nickel or cobalt based superalloys.

The forward hinged liners 50, 52 inherently provide effective seals with their corresponding hinge supports 56, 58 and provide effective seals along their axial edges. The differential pressure which exists between the coolant 14 and the exhaust gases 20 during operation provides a radially inwardly directed differential pressure force acting on the liners 50, 52 which maintains effective sealing contact between the edges of the seal liners 52 radially atop the primary liners 50. The hinge ends 52a of the seal liners 52 are allowed by the second hinge slot 58e to slightly unseat therefrom for enhancing the sealing effectiveness of the edges of the seal liners 52 against the outer surfaces of the primary liners 50.

Reaction forces acting atop the seal liners 52 is therefore carried by the primary liners 50, and in turn is carried by the primary flaps 38 through the support links 60, and by the first and second hinge supports 56, 58. The net loading on the primary flaps 38, however, is about the same with or without the liners 50, 52 in place.

As indicated above, the support links 60 allow the flap duct outlet area to be varied between the open and closed positions of the primary flaps 38. In this way, coolant flow through the flap duct 54 may be optimized between these positions.

Furthermore, the individual liners 50, 52 are readily removable from the corresponding hinge supports 56, 58 and may be readily replaced as required. Since the primary flaps 38 are already structural components, supporting the liners 50, 52 therefrom in part minimally affects seal and flap edge interference, loads, and overboard leakage. And, the liners 50, 52 may be used in existing nozzle designs with relatively few changes therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An exhaust nozzle comprising:
   an annular exhaust casing having an annular exhaust liner spaced radially inwardly therefrom to define a cooling duct for channeling a coolant therethrough;
   a plurality of circumferentially spaced apart primary flaps having forward ends hinged to said casing for allowing pivoting movement;
   a plurality of circumferentially spaced apart primary seals having forward ends hinged to said casing for allowing pivoting movement, and said primary seals overlapping provide seals therewith, with said primary flaps and primary seals collectively defining an annular throat for discharging exhaust gases;
   means for actuating said primary flaps between open and closed positions for varying flow area of said throat between maximum and minimum areas, respectively;
   a plurality of primary liners spaced radially inwardly from respective ones of said primary flaps;
   a plurality of seal liners spaced radially inwardly from respective ones of said primary seals, and circumferentially overlapping adjacent ones of said primary liners to provide seals therewith, with said primary liners and seal liners collectively defining an annular flap duct disposed in flow communication with said cooling duct for receiving said coolant therefrom for cooling said primary flaps and primary seals; and
   means for pivotally mounting said primary liners and seal liners to said casing for allowing differential movement with respective ones of said primary flaps and primary seals.

2. A nozzle according to claim 1 wherein said mounting means comprise:
   a plurality of first hinge supports fixedly joined to said casing at respective ones of forward hinge ends of said primary liners, and each of said first hinge supports including an inlet disposed in flow communication with said cooling duct and said flap duct for channeling said coolant through said flap duct, and further including a first hinge slot for engaging said hinge end of said primary liner to define a first hinge; and
   a plurality of second hinge supports fixedly joined to said casing at respective forward hinge ends of said seal liners, and each of said second hinge supports including an inlet disposed in flow communication with said cooling duct and said flap duct for channeling said coolant through said flap duct, and further including a second hinge slot for engaging said hinge end of said seal liner to define a second hinge.

3. A nozzle according to claim 2 wherein. said primary liner hinge ends engage said first hinge slots at least in part with axial overlap for providing radially inward restraint;
   said second hinge slot opens radially inwardly for receiving said seal liner hinge end in radial outward restraint and without radial inward restraint; and
   said primary liners are disposed radially inwardly of said seal liners for radially inward retention thereof.

4. A nozzle according to claim 3 wherein said mounting means further comprise a plurality of support links joining said primary liners to respective ones of said primary flaps at an aft support disposed downstream of said primary liner hinge end, and said mounting means are configured for allowing relative axial movement therebetween as both said primary flaps and primary liners pivot about said first hinges.

5. A nozzle according to claim 4 wherein each of said support links extends radially between respective pairs of said primary flaps and primary liners, and is pivotally joined thereto.

6. A nozzle according to claim 5 wherein each of said support links is disposed substantially normal to said respective primary liner when said primary flap is in said closed position, and is disposed at an acute angle to said respective primary liner when said primary flap is in said open position.

7. A nozzle according to claim 4 wherein each of said support links is a rod extending longitudinally between said primary flaps and primary liners, and is slidingly mounted in a plurality of link blocks fixedly joined to said primary flaps and primary liners.

8. A nozzle according to claim 4 wherein each of said support links is a cantilever fixedly joined to respective ones of said primary flaps, and is slidingly mounted in a respective link block fixedly mounted to respective ones of said primary liners.

9. A nozzle according to claim 4 wherein said mounting means further comprise a pair of cooperating rails fixedly mounted on respective ones of said primary seals and seal liners for maintaining circumferential alignment therebetween.

10. A nozzle according to claim 4 further comprising a plurality of circumferentially spaced apart secondary flaps having forward ends hinged to respective aft ends of said primary flaps; and said flap duct includes an outlet at an aft end thereof disposed in flow communication with a radially inner surface of said secondary flaps for discharging said coolant therealong for film cooling said secondary flaps.

11. An exhaust nozzle comprising:

an annular casing;

respective pluralities of circumferentially adjoining primary flaps and primary seals;

respective pluralities of circumferentially adjoining primary liners and seal liners spaced radially inwardly from respective ones of said primary flaps and seals; and means for separately pivotally mounting each of said primary flaps, primary seals, primary liners, and seal liners to said casing.

12. A nozzle according to claim 11 wherein said mounting means are configured to allow differential movement between said primary flaps and primary liners, and between said primary seals and seal liners.

13. A nozzle according to claim 12 further comprising means for channeling a coolant radially inboard of said primary flaps and seals, and radially outboard of said primary liners and seal liners.

* * * * *